United States Patent
Choi et al.

(10) Patent No.: US 10,468,723 B2
(45) Date of Patent: Nov. 5, 2019

(54) ELECTROLYTE AND SECONDARY BATTERY INCLUDING THE ELECTROLYTE

(71) Applicant: SAMSUNG SDI CO., LTD., Yongin-si, Gyeonggi-do (KR)

(72) Inventors: Hyun Bong Choi, Yongin-si (KR); Ae Ran Kim, Yongin-si (KR); Mi Young Son, Yongin-si (KR); Woo Cheol Shin, Yongin-si (KR); Myung Heui Woo, Yongin-si (KR); Seung Tae Lee, Yongin-si (KR); Ha rim Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 357 days.

(21) Appl. No.: 15/409,716

(22) Filed: Jan. 19, 2017

(65) Prior Publication Data
US 2017/0222269 A1    Aug. 3, 2017

(30) Foreign Application Priority Data

Jan. 28, 2016    (KR) .................. 10-2016-0010983

(51) Int. Cl.
*H01M 10/0569* (2010.01)
*H01M 10/0525* (2010.01)
(Continued)

(52) U.S. Cl.
CPC ... *H01M 10/0569* (2013.01); *H01M 10/0525* (2013.01); *H01M 10/0563* (2013.01); *H01M 10/0567* (2013.01); *H01M 10/052* (2013.01); *H01M 2220/20* (2013.01); *H01M 2220/30* (2013.01); *H01M 2300/002* (2013.01); *H01M 2300/0025* (2013.01); *H01M 2300/0034* (2013.01); *H01M 2300/0037* (2013.01)

(58) Field of Classification Search
CPC ......... H01M 10/0569; H01M 10/0525; H01M 10/0567; H01M 10/0563; H01M 2300/0037; H01M 10/052; H01M 2220/20; H01M 2220/30; H01M 2300/002; H01M 2300/0034; H01M 2300/0025
See application file for complete search history.

(56) References Cited

U.S. PATENT DOCUMENTS

| | | | |
|---|---|---|---|
| 2008/0311478 A1* | 12/2008 | Onuki | H01M 10/052 429/231.95 |
| 2009/0280414 A1* | 11/2009 | Koh | H01M 4/13 429/304 |

(Continued)

FOREIGN PATENT DOCUMENTS

| | | |
|---|---|---|
| JP | 2000-195544 A | 7/2000 |
| JP | 2011-175959 A | 9/2011 |

(Continued)

OTHER PUBLICATIONS

Extended European Search Report issued by the European Patent Office dated Mar. 16, 2017 in the examination of the European Patent Application No. 17 153 304.5.

*Primary Examiner* — Michael L Dignan
(74) *Attorney, Agent, or Firm* — Lee & Morse, P.C.

(57) ABSTRACT

An electrolyte includes an organic solvent and a cyclic ester compound that is substituted with a sulfonate group.

12 Claims, 4 Drawing Sheets

(51) Int. Cl.
*H01M 10/0563* (2010.01)
*H01M 10/0567* (2010.01)
*H01M 10/052* (2010.01)

(56) References Cited

U.S. PATENT DOCUMENTS

| | | | |
|---|---|---|---|
| 2011/0111305 A1* | 5/2011 | Jeon | H01M 10/0525 429/326 |
| 2011/0159377 A1* | 6/2011 | Lee | H01M 4/139 429/306 |
| 2012/0219866 A1 | 8/2012 | Onuki et al. | |
| 2013/0130128 A1* | 5/2013 | Okamoto | H01M 10/0567 429/338 |
| 2014/0234727 A1* | 8/2014 | Abe | H01M 10/0567 429/331 |
| 2014/0295288 A1 | 10/2014 | Ding et al. | |
| 2016/0294008 A1* | 10/2016 | Yoshida | H01M 10/0525 |
| 2016/0351962 A1* | 12/2016 | Li | H01M 10/0567 |

FOREIGN PATENT DOCUMENTS

| | | |
|---|---|---|
| JP | 2013-211223 A | 10/2013 |
| KR | 10-2014-0063762 A | 5/2014 |
| WO | WO 2008/035928 A1 | 3/2008 |
| WO | WO 2009/022848 A1 | 2/2009 |
| WO | WO 2015/093580 A1 | 6/2015 |

* cited by examiner

ELECTROLYTE AND SECONDARY BATTERY INCLUDING THE ELECTROLYTE

CROSS-REFERENCE TO RELATED APPLICATION

Korean Patent Application No. 10-2016-0010983, filed on Jan. 28, 2016, in the Korean Intellectual Property Office, and entitled: "Electrolyte and secondary battery including the electrolyte," is incorporated by reference herein in its entirety.

BACKGROUND

1. Field

Embodiments relate to an electrolyte and a secondary battery including the electrolyte.

2. Description of the Related Art

Due to the advancements of small, high tech devices such as digital cameras, mobile devices, laptops, and computers, demand for lithium secondary batteries as energy sources for such devices is rapidly increasing. Also, due to the commercialization of xEV, that is, hybrid electric vehicles (HEV), plug-in hybrid electric vehicles (PHEV), and electric vehicles (EV), safe lithium ion batteries having high capacity have been developed.

SUMMARY

Embodiments are directed to an electrolyte including a cyclic ester compound substituted with a sulfonate group, and an organic solvent.

The cyclic ester compound may be represented by Formula 1:

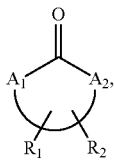

[Formula 1]

wherein, in Formula 1, $A_1$ and $A_2$ each independently are oxygen (O) or sulfur (S),

is selected from a substituted or unsubstituted C1 to C10 alkylene group or a substituted or unsubstituted C2 to C10 alkenylene group, and at least one selected from $R_1$ and $R_2$ is a sulfonate group, wherein, when only one of $R_1$ and $R_2$ is a sulfonate group, the other one of $R_1$ and $R_2$ is hydrogen, a halogen, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group.

The sulfonate group may be represented by Formula 2:

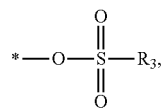

[Formula 2]

wherein, in Formula 2, $R_3$ is a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group.

$A_1$ and $A_2$ may each be oxygen (O),

The cyclic ester compound may include at least one of compounds represented by Formula 3 or Formula 4:

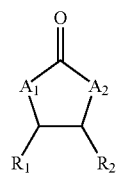

[Formula 3]

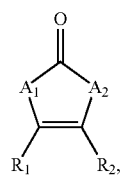

[Formula 4]

wherein, in Formulae 3 and 4, $A_1$ and $A_2$ each independently are oxygen (O) or sulfur (S), at least one selected from $R_1$ and $R_2$ is a sulfonate group represented by Formula 2, wherein, when only one of $R_1$ and $R_2$ is a sulfonate group, the other one of $R_1$ and $R_2$ is hydrogen, a halogen, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group:

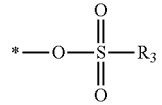

[Formula 2]

wherein, in Formula 2, $R_3$ is a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group.

The cyclic ester compound may include at least one of compounds represented by Formulae 5 to 8:

[Formula 5]

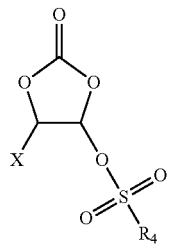

[Formula 6]

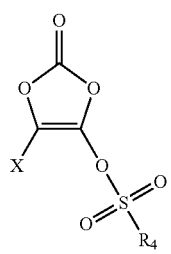

[Formula 7]

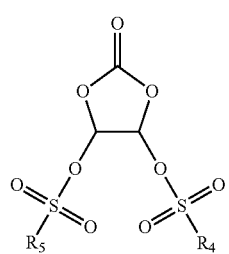

[Formula 8]

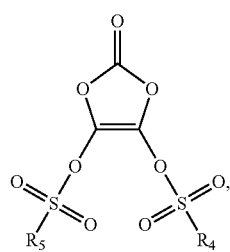

wherein, in Formulae 5 to 8, X is hydrogen, a halogen, a halogen-substituted or unsubstituted C1 to C30 alkyl group, a halogen-substituted or unsubstituted C2 to C30 alkenyl group, or a halogen-substituted or unsubstituted C2 to C30 alkynyl group, and $R_4$ and $R_5$ each independently are a halogen-substituted or unsubstituted C1 to C30 alkyl group, a halogen-substituted or unsubstituted C2 to C30 alkenyl group, or a halogen-substituted or unsubstituted C2 to C30 alkynyl group. In Formulae 5 and 6, X is hydrogen, a halogen, or a substituted or unsubstituted C1 to C30 alkyl group, and in Formulae 5 to 8, $R_3$, $R_4$, and $R_5$ each independently are a substituted or unsubstituted C1 to C30 alkyl group An amount of the cyclic ester compound may be in a range of 0.01 wt % to 20 wt % based on a total weight of the electrolyte.

The organic solvent includes at least one selected from a carbonate-based solvent, an ester-based solvent, an ether-based solvent, a ketone-based solvent, an alcohol-based solvent, and an aprotic solvent.

The electrolyte may further include a lithium salt.

Embodiments are also directed to a secondary battery including the electrolyte as described above.

The secondary battery may operate at a voltage range of 2.8 V to 4.6 V.

The secondary battery may be a lithium secondary battery.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
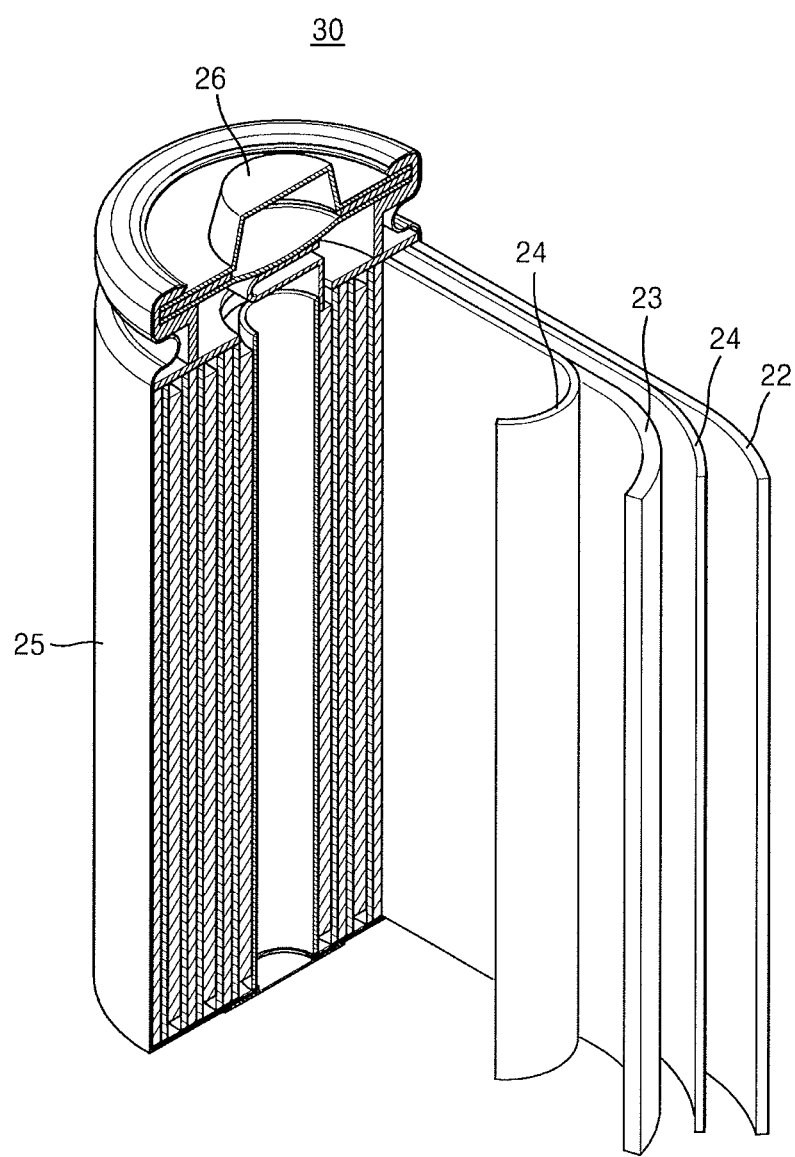
FIG. 1 illustrates a schematic view of a lithium secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

Expressions such as "at least one of," when preceding a list of elements, modify the entire list of elements and do not modify the individual elements of the list.

An electrolyte according to an embodiment of the present disclosure includes an organic solvent and a cyclic ester compound that is substituted with a sulfonate group.

The cyclic ester compound may be represented by Formula 1:

[Formula 1]

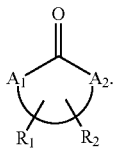

In Formula 1, $A_1$ and $A_2$ may each independently be oxygen (O) or sulfur (S),

may be a substituted or unsubstituted C1 to C10 alkylene group or a substituted or unsubstituted C2 to C10 alkenylene group, and at least one selected from $R_1$ and $R_2$ is a sulfonate group, wherein, when only one of $R_1$ and $R_2$ is a sulfonate group, the other one of $R_1$ and $R_2$ is hydrogen, a halogen, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group. Herein, the statement that

may be a substituted or unsubstituted C1 to C10 alkylene group or a substituted or unsubstituted C2 to C10 alkenylene group" may have the same meaning as a statement that "$A_1$ and $A_2$ are connected to each other by a substituted or unsubstituted C1 to C10 alkylene group or a substituted or unsubstituted C2 to C10 alkenylene group."

The sulfonate group in Formula 1 may be represented by Formula 2:

[Formula 2]

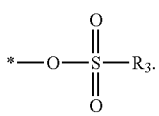

In Formula 2, $R_3$ may be a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group.

In an embodiment, the cyclic ester compound may include at least one of compounds represented by one of Formulae 3 and 4:

[Formula 3]

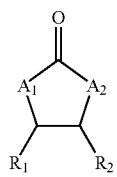

[Formula 4]

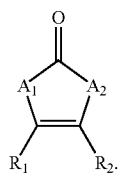

In Formulae 3 and 4, $A_1$ and $A_2$ may each independently be oxygen (O) or sulfur (S), at least one selected from $R_1$ and $R_2$ may be the sulfonate group represented by Formula 2, wherein, when only one of $R_1$ and $R_2$ is a sulfonate group, the other one of $R_1$ and $R_2$ is hydrogen, a halogen, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group:

[Formula 2]

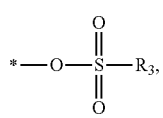

In Formula 2, $R_3$ may be a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group.

In one embodiment, the cyclic ester compound may include at least one of compounds represented by one of Formulae 5 to 8:

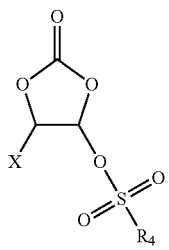

[Formula 5]

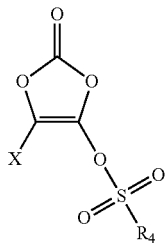

[Formula 6]

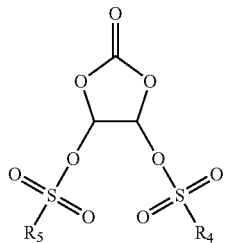

[Formula 7]

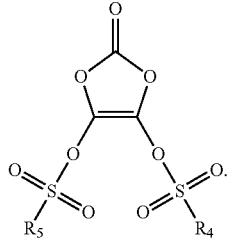

[Formula 8]

In Formulae 5 and 6, X may be hydrogen, a halogen, a halogen-substituted or unsubstituted C1 to C30 alkyl group, a halogen-substituted or unsubstituted C2 to C30 alkenyl group, or a halogen-substituted or unsubstituted C2 to C30 alkynyl group, and In Formulae 5 to 8, $R_4$ and $R_5$ may each independently be a halogen-substituted or unsubstituted C1 to C30 alkyl group, a halogen-substituted or unsubstituted C2 to C30 alkenyl group, or a halogen-substituted or unsubstituted C2 to C30 alkynyl group.

An amount of the cyclic ester compound may be, for example, in a range of 0.01 to 20 wt % based on the total weight of the electrolyte. An amount of the cyclic ester compound may be, for example, in a range of 0.1 to 15 wt %, or 1 to 10 wt %. Within these ranges, the cyclic ester compound included in the electrolyte may appropriately form a thin film on the surface of an anode, thereby effectively suppressing an increase in the interior resistance of a secondary battery at a high temperature.

The organic solvent of the electrolyte may act as a medium through which ions participating in an electrochemical reaction of a battery flow.

The organic solvent may be a non-aqueous organic solvent. Examples of the non-aqueous organic solvent include a carbonate-based compound, an ester-based compound, an ether-based compound, a ketone-based compound, an alcohol-based compound, an aprotic solvent, and a combination thereof.

Examples of the carbonate-based compound include a chain carbonate compound, a cyclic carbonate compound, a fluoro carbonate compound thereof, and a combination thereof.

Examples of the chain carbonate compound include diethyl carbonate (DEC), dimethyl carbonate (DMC), dipropyl carbonate (DPC), methylpropyl carbonate (MPC), ethylpropyl carbonate (EPC), methylethyl carbonate (MEC), and a combination thereof. Examples of the cyclic carbonate compound include ethylene carbonate (EC), propylene carbonate (PC), butylene carbonate (BC), vinylethylene carbonate (VEC), and a combination thereof.

Examples of the fluoro carbonate compound include fluoroethylene carbonate (FEC), 4,5-difluoroethylenecarbonate, 4,4-difluoroethylenecarbonate, 4,4,5-trifluoroethylenecarbonate, 4,4,5,5-tetrafluoroethylenecarbonate, 4-fluoro-5-methylethylenecarbonate, 4-fluoro-4-methylethylenecarbonate, 4,5-difluoro-4-methylethylenecarbonate, 4,4,5-trifluoro-5-methylethylenecarbonate, trifluoromethyl ethylene carbonate, and a combination thereof.

For use as the carbonate-based compound, the chain carbonate compound and the cyclic carbonate compound may be mixed. In one embodiment, an amount of the cyclic carbonate compound may be, based on the total volume of the non-aqueous organic solvent, at least 20 vol % or more, or 30 vol % or more, or 40 vol % or more to obtain improved cyclic characteristics. In one embodiment, the amount of the cyclic carbonate compound may be in a range of 20 vol % to 70 vol % based on the total volume of the non-aqueous organic solvent.

For use as the carbonate-based compound, a fluoro carbonate compound may be further mixed with at least one selected from the chain carbonate compound and the cyclic carbonate compound. The fluoro carbonate compound may contribute to an increase in solubility of a lithium salt, thereby increasing ion conductivity and allowing a thin film to be well-formed on an anode. In one embodiment, the fluoro carbonate compound may be FEC.

The fluoro carbonate compound may be used in an amount of 1 to 30 vol % based on the total volume of a non-aqueous organic solvent. Within this range, desired effects may be obtained while the viscosity of the electrolyte may be appropriately maintained. In one embodiment, the non-aqueous organic solvent may include VEC together with FEC. The VEC may be included in an amount of 0.1 to 10 vol % based on the total volume of the non-aqueous organic solvent.

Examples of the ester-based compound include methyl acetate, acetate, n-propyl acetate, dimethyl acetate, methyl propionate, ethyl propionate, γ-butyrolactone, decanolide, valerolactone, mevalonolactone, caprolactone, and methyl formate.

Examples of the ether-based compound include dibutyl ether, tetraglyme, diglyme, 1,2-dimethoxyethane, 1,2-diethoxyethane, ethoxymethoxyethane, 2-methyltetrahydrofuran, and tetrahydrofuran.

Examples of the ketone-based compound include cyclohexanone.

Examples of the alcohol-based compound include ethyl alcohol and isopropyl alcohol.

Examples of the aprotic solvent include dimethyl sulfoxide, 1,2-dioxolane, sulfolane, methyl sulfolane, 1,3-dimethyl-2-imidazolidinone, N-methyl-2-pyrrolidinone, formamide, dimethylformamide, acetonitrile, nitromethane, phosphoric acid trimethyl, phosphoric acid triethyl, phosphoric acid trioctyl, and phosphoric acid triester.

These organic solvents may be used alone or in combination of two or more of the foregoing materials. When two or more organic solvents are used in combination, a mixed ratio thereof may be appropriately adjusted depending on the performance of a battery.

The electrolyte may further include a lithium salt.

The lithium salt acts as a supplier for lithium ions in a battery, enabling operation of a lithium battery. The lithium salt may be a suitable material that is commercially available for use in a secondary battery and is easily dissolved in a non-aqueous electrolyte. Examples of such a material include LiCl, LiBr, LiI, LiClO$_4$, LiB$_{10}$Cl$_{10}$, LiPF$_6$, CF$_3$SO$_3$Li, CH$_3$SO$_3$Li, C$_4$F$_3$SO$_3$Li, (CF$_3$SO$_2$)$_2$NLi, LiN(C$_x$F$_{2x+1}$SO$_2$)(C$_y$F$_{2+y}$SO$_2$) (where x and y are each a natural number), CF$_3$CO$_2$Li, LiAsF$_6$, LiSbF$_6$, LiAlCl$_4$, LiAlF$_4$, lithiumchloroborate, low aliphatic lithium carbonate, 4 phenyl lithium borate, and lithium imide.

To obtain an appropriate performance of a battery, the lithium salt may be used in a concentration of, for example, about 0.1 M to about 5.0 M, or about 0.1 M to about 2.0 M. When the concentration of the lithium salt is within these ranges, the electrolyte may have an appropriate level of conductivity and an appropriate level of viscosity, and accordingly, the prepared electrolyte may have excellent performance, and lithium ions may effectively migrate.

To promote the formation of a stable solid-electrolyte interface (SEI) or thin film on the surface of an electrode to improve electrochemical characteristics, such as cyclic characteristics, the electrolyte may further include an additive.

Examples of the additive include tris (trimethylsilyl) phosphate (TMSPa), lithium difluorooxalatoborate (LiFOB), vinylene carbonate (VC), propanesultone (PS), succinonitrile (SN), LiBF$_4$, a silane compound having a functional group that enables a siloxane bond, and a silazane compound, such as a hexamethyldisilazane, wherein such a functional group may be acryl, amino, epoxy, methoxy, ethoxy, or vinyl. These additives may be used alone or in combination of two or more of the foregoing materials.

The additive may be included a suitable amount to provide improvement effects on the capacity retention ratio of a secondary battery. For example, the additive may be included in an amount of 0.01 wt % to 10 wt % based on the total weight of the non-aqueous organic solvent. In one embodiment, the amount of the additive may be included in an amount of 0.05 to 10 wt %, 0.1 to 5 wt %, or 0.5 to 4 wt %, based on the total weight of the non-aqueous organic solvent.

The electrolyte may be used in a secondary battery that operates in a medium or high voltage range of 2.8 V to 4.6 V to improve cell performance and stability. For example, the electrolyte may be appropriately used in a high-voltage battery that operates at a voltage of 4.3 V to 4.6 V.

Another aspect of embodiments of the present disclosure is directed to a secondary battery including the electrolyte.

The secondary battery may be a lithium secondary battery.

In one embodiment, the lithium secondary battery includes a cathode, an anode and an electrolyte between the cathode and the anode. The lithium secondary battery may be manufactured by a suitable method.

FIG. 1 illustrates a schematic view of a lithium secondary battery 30 according to an embodiment of the present invention.

Referring to FIG. 1, the lithium secondary battery 30 may include a cathode 23, an anode 22, and a separator 24 between the cathode 23 and the anode 22. The cathode 23, the anode 22, and the separator 24 may be wound or folded and then placed in a battery case 25. An electrolyte may be injected into the battery case 25, which is then sealed using a sealing member 26, thereby completing the manufacture of the lithium secondary battery 30. The battery case 25 may be a round case, a rectangular case, or a thin-film type case. The lithium secondary battery 30 may be a lithium ion battery.

The cathode 23 may include a cathode current collector and a cathode active material layer formed on the cathode current collector.

The cathode current collector may have a thickness of 3 to 500 μm. A material for forming the cathode current collector may be a suitable material that t does not cause chemical changes in a corresponding battery and that has conductivity. Examples of such a material include copper, stainless steel, aluminum, nickel, titanium, calcined carbon, copper or stainless steel that is surface-treated with carbon, nickel, titanium, or silver, and an aluminum-cadmium alloy. The cathode current collector may have an uneven surface, and due to the uneven surface, a cathode active material may strongly bond thereto. In one embodiment, the cathode current collector may have the form of a film, a sheet, a foil, a net, a porous structure, a foam, a non-woven fabric, or the like.

The cathode active material layer includes a cathode active material, a binder, and, optionally, a conductive material.

The cathode active material may be any lithium-containing metal oxide that is conventionally used in the art. For example, the cathode active material may include one or more composite oxides of lithium and a metal selected from cobalt, manganese, nickel, and a combination thereof. Examples of such a composite oxide of lithium and metal include compounds represented by one of Li$_a$A$_{1-b}$B'$_b$D$_2$ (where 0.90≤a≤1 and 0≤b≤0.5); Li$_a$E$_{1-b}$B'$_b$O$_{2-c}$D$_c$ (where 0.90≤a≤1, 0≤b≤0.5, and 0≤c≤0.05); LiE$_{2-b}$B'$_b$O$_{4-c}$D$_c$ (where 0≤b≤0.5 and 0≤c≤0.05); Li$_a$Ni$_{1-b-c}$Co$_b$B'$_c$D$_\alpha$ (where 0.90≤a≤1, 0≤b≤0.5, 0≤c≤0.05, and 0<α≤2); Li$_a$Ni$_{1-b-c}$Co$_b$B'$_c$O$_{2-\alpha}$F'$_\alpha$ (where 0.90≤a≤1, 0≤b≤0.5, 0≤c≤0.05, and 0<α<2); Li$_a$Ni$_{1-b-c}$Co$_b$B'$_c$O$_{2-\alpha}$F'$_2$ (where 0.90≤a≤1, 0≤b≤0.5, 0≤c≤0.05, and 0<α<2); Li$_a$Ni$_{1-b-c}$Mn$_b$B'$_c$D$_\alpha$ (where 0.90≤a≤1, 0≤b≤0.5, 0≤c≤0.05, and 0<α≤2); Li$_a$Ni$_{1-b-c}$Mn$_b$Mn$_b$B'$_c$O$_{2-\alpha}$F'$_\alpha$ (where 0.90≤a≤1, 0≤b≤0.5, 0≤c≤0.05, and 0<α<2); Li$_a$Ni$_{1-b-c}$Mn$_b$B'$_c$O$_{2-\alpha}$F'$_2$ (where 0.90≤a≤1, 0≤b≤0.5, 0≤c≤0.05, and 0<α<2); Li$_a$Ni$_b$E$_c$G$_d$O$_2$ (where 0.90≤a≤1, 0≤b≤0.9, 0≤c≤0.5, and 0.001≤d≤0.1); Li$_a$Ni$_b$Co$_c$Mn$_d$GeO$_2$ (where 0.90≤a≤1, 0≤b≤0.9, 0≤c≤0.5, 0≤d≤0.5, and 0.001≤e≤0.1); Li$_a$NiG$_b$O$_2$ (where 0.90≤a≤1 and 0.001≤b≤0.1); Li$_a$CoG$_b$O$_2$ (where 0.90≤a≤1 and 0.001≤b≤0.1); Li$_a$MnG$_b$O$_2$ (where 0.90≤a≤1 and 0.001≤b≤0.1); Li$_a$Mn$_2$G$_b$O$_4$ (where 0.90≤a≤1 and 0.001≤b≤0.1); QO$_2$; QS$_2$; LiQS$_2$; V$_2$O$_5$; LiV$_2$O$_5$; LiI'O$_2$; LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); and LiFePO$_4$.

In the formulae above, A may be Ni, Co, Mn, or a combination thereof; B' may be Al, Ni, Co, Mn, Cr, Fe, Mg, Sr, V, a rare-earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

For example, $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ (0≤x≤0.5, 0≤y≤0.5), $FePO_4$ may be used.

These compounds may each have a coating layer on their surfaces, or these compounds may be mixed with a compound having a coating layer. The coating layer may include an oxide of a coating element, a hydroxide of a coating element, an oxyhydroxide of a coating element, an oxycarbonate of a coating element, or a hydroxycarbonate of a coating element. The compounds that form the coating layer may be amorphous or crystalline. As a coating element included in the coating layer, Mg, Al, Co, K, Na, Ca, Si, Ti, V, Sn, Ge, Ga, B, As, Zr, or a mixture thereof may be used. The coating layer may be formed using any one of various coating methods that are performed using the compounds and the elements and do not affect properties of the positive active material (for example, spray coating, immersion, or the like). These coating methods may be well understood by one of ordinary skill in the art.

The binder may allow cathode active material particles to attach to each other, and may also allow the cathode active material to attach to the cathode current collector. Examples of a material for the binder include polyvinyl alcohol, carboxymethyl cellulose, hydroxypropyl cellulose, diacetyl cellulose, vinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

The conductive material is used to provide conductivity to an electrode. The conductive material may be a suitable material that does not cause chemical changes in a corresponding battery and that conducts electrons. Examples of the conductive material include natural graphite, artificial graphite, carbon black, acetylene black, Ketjen black, carbon fiber, metal in the form of powder or fabric. The metal may be copper, nickel, aluminum, silver, or the like. In one embodiment, the conductive material may include at least one conductive material, such as a polyphenylene derivative.

The anode 22 may include an anode current collector and an anode active material layer formed on the anode current collector.

The anode current collector may have a thickness of 3 to 500 μm. A material for forming the anode current collector may be a suitable material that does not cause chemical changes in a corresponding battery and has conductivity. Examples of such a material include copper, stainless steel, aluminum, nickel, titanium, calcined carbon, copper or stainless steel that is surface-treated with carbon, nickel, titanium, or silver, and an aluminum-cadmium alloy. The anode current collector may have an uneven surface. Due to the uneven surface of the anode current collector, the cathode active material may strongly bond thereto. In one embodiment, the cathode current collector may have the form of a film, a sheet, a foil, a net, a porous structure, a foam, a non-woven fabric, or the like.

The anode active material layer may include an anode active material, a binder, and, optionally, a conductive material.

The anode active material may be a suitable material that is used in the art. For example, the anode active material may be selected from lithium metal, lithium-alloyable metal, a transition metal oxide, a material capable of doping or dedoping lithium, and a material capable of reversibly intercalating or deintercalating a lithium ion. Two or more of these materials may be mixed or combined for use as the anode active material.

As an alloy of the lithium metal, an alloy of lithium and a metal selected from Na, K, Rb, Cs, Fr, Be, Mg, Ca, Sr, Si, Sb, Pb, In, Zn, Ba, Ra, Ge, Al, and Sn may be used.

Non-limiting examples of the transition metal oxide include tungsten oxide, molybdenum oxide, titanium oxide, lithium titanium oxide, vanadium oxide, and lithium vanadium oxide.

Examples of the material capable of doping or dedoping lithium include Si, Sn, Al, Ge, Pb, Bi, Sb, $SiO_x$ (0<x<2), a Si—Z alloy (where Z is alkali metal, alkaline earth metal, a Group 11 element, a Group 12 element, a Group 13 element, a Group 14 element, a Group 15 element, a Group 16 element, transition metal, a rare-earth element, or a combination thereof, and is not Si), $SnO_x$ (0<x<2), and a Sn—Z' alloy (where Z' is alkali metal, alkaline earth metal, a Group 11 element, a Group 12 element, a Group 13 element, a Group 14 element, a Group 15 element, a Group 16 element, transition metal, a rare-earth element, or a combination thereof, and is not Sn). Herein, Z or Z' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material capable of reversibly intercalating or deintercalating a lithium ion may be a carbonaceous material, for example, a carbonaceous anode active material that is generally used in a lithium battery. Examples of the material capable of reversibly intercalating or deintercalating a lithium ion include crystalline carbon, amorphous carbon, or a mixture thereof. Non-limiting examples of the crystalline carbon include natural graphite, artificial graphite, expandable graphite, graphene, fullerene soot, carbon nanotube, and carbon fiber. Non-limiting examples of the amorphous carbon include soft carbon (low-temperature calcined carbon) or hard carbon, meso-phase pitch carbide, and calcined coke. The carbonaceous anode active material may be used in a spherical form, a tabular form, a fibrous form, a tube form, or a powder form.

In one embodiment, the anode active material may include a silicon-based anode active material. In one embodiment, the anode active material may include a material selected from Si, $SiO_x$ (0<x<2), Si—Z alloy (where Z is alkali metal, alkaline earth metal, a Group 13 element, a Group 14 element, a Group 15 element, a Group 16 element, transition metal, a rare-earth element, or a combination thereof, and is not Si), and a combination thereof. Herein, Z may be selected from Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. Such silicon-based anode active materials including Si, $SiO_x$, and Si—Z alloy may substantially be crystalline (including mono-crystalline or polycrystalline), non-crystalline, or a mixture thereof.

The binder may allow anode active material particles to attach to each other, and may also attach the anode active material to a current collector. Examples of the binder include polyvinyl alcohol, carboxymethyl cellulose, hydroxypropyl cellulose, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The conductive material may be used to provide conductivity to an electrode. The conductive material may be a suitable material that does not cause chemical changes in a corresponding battery and that conducts electrons. Examples of the conductive material include a carbonaceous material, such as natural graphite, artificial graphite, carbon black, acetylene black, Ketjen black, or carbon fiber; a metal material, such as copper, nickel, or aluminum, in the form of powder or fiber; a conductive polymer, such as a polyphenylene derivative; and a mixture thereof.

The cathode 23 and the anode 22 may each be manufactured by mixing an active material, a conductive material, and a binder in a solvent to prepare an active material composition and doping the active material composition onto a current collector.

This method of manufacturing an electrode is widely known in the ar. The solvent may be N-methylpyrrolidone (NMP), acetone, or water, as examples.

The cathode 23 and the anode 22 may be separated from each other by the separator 24. The separator 24 may be a suitable material that is used in a lithium secondary battery. The material for forming the separator 24 may have low resistance to the flow of ions of an electrolyte and excellent electrolytic solution-retaining capability. The separator 24 may be a single film or a multi-layered film. For example, the material for forming the separator 24 may be selected from glass fiber, polyester, Teflon, polyethylene, polypropylene, polytetrafluoroethylene (PTFE), or a combination thereof. The material for forming the separator 24 may be in a woven form or a non-woven form. The separator 24 may have pores having a diameter of 0.01 to 10 µm and may have a thickness of 3 to 100 µm.

As described above, the electrolyte includes the cyclic ester compound and the organic solvent. The electrolyte may be injected between the cathode 23 and the anode 22, which are separated by the separator 24.

Due to the use of the electrolyte, a thin film may be formed on the anode 22 of the lithium secondary battery 30. The thin film on the anode 22 may be an SEI layer that has improved stability, that does not change during high-temperature storage, and that retains its solidity even after charging and discharging.

The lithium secondary battery 30 may be used in, in addition to mobile phones or mobile computers, applications that require high voltage, high output, and a high-temperature operation. An example of such applications is an electric vehicle. In one or more embodiments, the secondary battery may be used in hybrid vehicles along with internal combustion engines, fuel batteries, or super capacitors. The secondary battery may also be used in, for example, electric bicycles or gearing tools, which require high voltage, high output, and a high-temperature operation.

Substituents in the formulae used herein may be defined as follows.

The term "alkyl" used herein refers to a fully saturated branched or unbranched (or straight chain or linear) hydrocarbon moiety.

Non-limiting examples of the term "alkyl" used herein include methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the "alkyl" may be substituted with a halogen atom, a C1-C20 alkyl group substituted with a halogen atom (for example, $CCF_3$, $CHCF_2$, $CH_2F$ or $CCl_3$), a C1-C20 alkoxy, a C2-C20 alkoxyalkyl, a hydroxy group, a nitro group, a cyano group, an amino group, an amidino group, a hydrazine, a hydrazone, a carboxyl group or a salt thereof, a sulfonyl group, a sulfamoyl, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" used herein refers to a fluorine, bromine, chlorine, or iodine atom. The term "halo group" refers to a fluoro, bromo, chloro, or iodo group.

The term "a C1-C20 alkyl group substituted with a halogen atom" used herein refers to a C1-C20 alkyl group that is substituted with one or more halo groups. Non-limiting examples thereof include monohaloalkyl, dihaloalkyl, and polyhaloalkyl groups, including perhaloalkyl groups.

A monohaloalkyl group has one iodo, bromo, chloro or fluoro group within the alkyl group. Dihaloalky and polyhaloalkyl groups have two or more of identical halo groups or a combination of different halo groups within the alkyl.

The term "alkoxy" used herein refers to alkyl-O—, wherein alkyl is defined herein above. Non-limiting examples of alkoxy groups include methoxy, ethoxy, propoxy, 2-propoxy, butoxy, tert-butoxy, pentyloxy, hexyloxy, cyclopropyloxy, and cyclohexyloxy groups. At least one hydrogen atom of the alkoxy group may be substituted with a same substituent as described above in connection with the alkyl group.

The term "alkoxyalkyl" used herein refers to an alkyl group, as defined above, in which the alkyl group is substituted with an alkoxy group. At least one hydrogen atom of the alkoxyalkyl group may be substituted with a same substituent as described above in connection with the alkyl group. The term alkoxyalkyl used herein includes a substituted alkoxyalkyl moiety.

The term "alkenyl" refers to a branched or unbranched hydrocarbon having at least one carbon-carbon double bond. Non-limiting examples of an alkenyl group include vinyl, allyl, butenyl, isopropenyl, and isobutenyl groups. At least one hydrogen atom of the alkenyl group may be substituted with a same substituent as described above in connection with the alkyl group.

The term "alkynyl" used herein refers to a branched or unbranched hydrocarbon having at least one carbon-carbon triple bond. Non-limiting examples of an alkynyl group include ethynyl, butyryl, isobutynyl, and isopropynyl groups.

At least one hydrogen atom of the alkynyl group may be substituted with a same substituent as described above in connection with the alkyl group.

The term "aryl" used herein refers to an aromatic hydrocarbon including at least one ring that is used alone or in combination.

The term "aryl" also refers to a group in which an aromatic ring is fused with one or more cycloalkyl rings.

Non-limiting examples of an aryl group include phenyl, naphthyl, and tetrahydronaphthyl groups.

At least one hydrogen atom of the aryl group may be substituted with a same substituent as described above in connection with the alkyl group.

The term "arylalkyl" refers to an alkyl group substituted with an aryl group. Examples of an arylalkyl group include benzyl or phenyl-$CH_2CH_2$—.

The term "aryloxy" refers to an —O-aryl group. Examples of an aryloxy group include phenoxy. At least one hydrogen atom of aryloxy group may be substituted with a same substituent as described above in connection with the alkyl group.

The term "heteroaryl" used herein refers to a monocyclic or bicyclic organic compound that contains one or more heteroatoms selected from N, O, P, and S, and carbon atoms as the remaining ring atoms. The heteroaryl group may include, for example, 1 to 5 heteroatoms, and 5 to 10 ring members. S or N may be oxidized to various oxidation states.

At least one hydrogen atom of the heteroaryl group may be substituted with a same substituent as described above in connection with the alkyl group.

The term "heteroarylalkyl" used herein refers to an alkyl group substituted with a heteroaryl group.

The term "heteroaryloxy" used herein refers to an —O-heteroaryl group. At least one hydrogen atom of the heteroaryloxy group may be substituted with a same substituent as described above in connection with the alkyl group.

The term "heteroaryloxyalkyl" used herein refers to an alkyl group substituted with a heteroaryloxy group. At least one hydrogen atom of the heteroaryloxyalkyl group may be substituted with a same substituent as described above in connection with the alkyl group.

The term "carbocyclic" used herein refers to saturated or partially unsaturated but non-aromatic monocyclic, bicyclic or tricyclic hydrocarbon groups.

Examples of the monocyclic hydrocarbon group include cyclopentyl, cyclopentenyl, cyclohexyl, and cyclohexenyl. Examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl.

Examples of the tricyclic hydrocarbon group include adamantyl.

At least one hydrogen atom of the "carbocyclic" may be substituted with a same substituent as described above in connection with the alkyl group.

The term "heterocyclic" group used herein refers to a ring containing 5-10 ring atoms including a heteroatom such as N, S, P, or O. An example of a heterocyclic group is pyridyl. At least one hydrogen atom of the heterocyclic group may be substituted with a same substituent as described above in connection with the alkyl group.

The term "heterocyclicoxy" used herein refers to an —O-heterocycle group. At least one hydrogen atom in a heterocyclicoxy group may be substituted with a same substituent as described above in connection with the alkyl group.

The term "sulfonyl" used herein refers to R"—SO$_2$—, wherein R" is hydrogen, alkyl, aryl, heteroaryl, aryl-alkyl, heteroaryl-alkyl, alkoxy, aryloxy, cycloalkyl, or heterocyclic.

The term "sulfamoyl" used herein includes H$_2$NS(O$_2$)—, alkyl-NHS(O$_2$)—, (alkyl)$_2$NS(O$_2$)-aryl-NHS(O$_2$)—, alkyl-(aryl)-NS(O$_2$)—, (aryl)$_2$NS(O)$_2$, heteroaryl-NHS (O$_2$)—, (aryl-alkyl)-NHS(O$_2$)—, or (heteroaryl-alkyl)-NHS(O$_2$)—.

At least one hydrogen atom of the sulfamoyl group may be substituted with a same substituent as described above in connection with the alkyl group.

The term "amino group" includes compounds wherein a nitrogen atom is covalently bonded to at least one carbon or heteroatom. The term "amino group" used herein includes —NH$_2$ and substituted moieties. The term also includes "alkylamino" wherein a nitrogen atom is bound to at least one additional alkyl group. The term also includes "arylamino" and "diarylamino" wherein the nitrogen is bound to at least one or two independently selected aryl groups.

The terms alkylene, arylene, and heteroarylene refer to a divalent group obtained from alkyl, aryl, and heteroaryl, respectively.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

(1) Preparation of Electrolyte

EC and DMC were mixed at a volumetric ratio of 20:80 to prepare a mixed solvent. LiPF$_6$ was added to the mixed solvent such that the concentration of LiPF$_6$ was 1.5 M. As an additive, 1 wt % of Compound 1 represented by Formula 9 was added to the mixed solvent, thereby completing the preparation of an electrolyte:

[Formula 9]

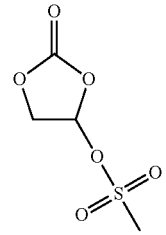

(2) Preparation of Tri-Electrode Cell

Artificial graphite, which is an active material, styrene-butadiene rubber, and carboxymethylcellulose were mixed at a weight ratio of 90:5:5, and NMP was added in a solid content of 60 wt % thereto to control viscosity of the result, thereby preparing anode slurry. The anode slurry was coated to a thickness of about 40 μm onto a copper foil current collector having a thickness of 10 μm. The result was dried at room temperature, and then, dried at a temperature of 120° C., followed by compression, thereby completing the preparation of an anode.

With respect to the anode, Li metal was used as a counter electrode and a reference electrode. The electrolyte was provided to the resultant structure, thereby completing the manufacture of a tri-electrode cell.

(3) Manufacturing of Coin Full Cell

A 18650-type coin full cell was manufactured by using the electrolyte.

LiNi$_{1/3}$Co$_{1/3}$Mn$_{1/3}$O$_2$ powder, which is a cathode active material, a carbon conductive material (Super-P; Timcal Ltd.), and a polyvinylidene fluoride (PVDF) binder were mixed at a weight ratio of 90:5:5, and then, NMP, which is a solvent, was added in a solid content of 60 wt % thereto to control viscosity of the result, thereby completing the preparation of cathode slurry. The cathode slurry was coated to a thickness of about 40 μm onto an aluminum foil having a thickness of 15 μm. The result was dried at room temperature, and then, dried at a temperature of 120° C., followed by compression, thereby completing the manufacture of a cathode.

Separately, artificial graphite, which is an anode active material, styrene-butadiene rubber, and carboxymethyl cellulose were mixed at a weight ratio of 90:5:5, and NMP was added in a solid content of 60 wt % thereto to control viscosity of the result, thereby completing the preparation of anode slurry. The anode slurry was coated to a thickness of about 40 μm onto a copper foil current collector having a thickness of 10 μm. The result was dried at room temperature, and then, dried at a temperature of 120° C., followed by compression, thereby completing the manufacture of an anode.

A 20 μm-thick polyethylene separator (Celgard PE 20 micron separator), the electrolyte, the anode, and the cathode were used to manufacture a 18650-type coin full cell.

Example 2

A tri-electrode cell and a coin full cell were manufactured in the same manner as in Example 1, except that the compound represented by Formula 9 was added to the electrolyte in an amount of 7 wt % of the electrolyte.

Comparative Example 1

A tri-electrode cell and a coin full cell were manufactured in the same manner as in Example 1, except that the compound represented by Formula 9 was not added to the electrolyte.

Comparative Example 2

A tri-electrode cell and a coin full cell were manufactured in the same manner as in Example 1, except that FEC represented by Formula 10 was added in an amount of 1 wt % to the electrolyte.

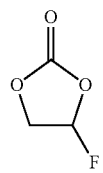

[Formula 10]

Evaluation Example 1: Cyclovoltametry Analysis

Cyclovoltametry was performed on the tri-electrode cells manufactured according to Comparative Example 1 and Example 1 to identify whether an initial SEI layer was formed. For this experiment, M273A potentiostat/galvanostat (EG&G) was used, and a scan rate was about 2 mV/s.

Cyclovoltametry was performed by using a Bio-logics impedance analyzer, which is a device for measuring impedance, in a range of 0 V to 3 V, in 5 cycles, and at a scan rate of 1 mV/s. The principle for measurement is to identify a change in voltage at a constant current.

Figure 2:
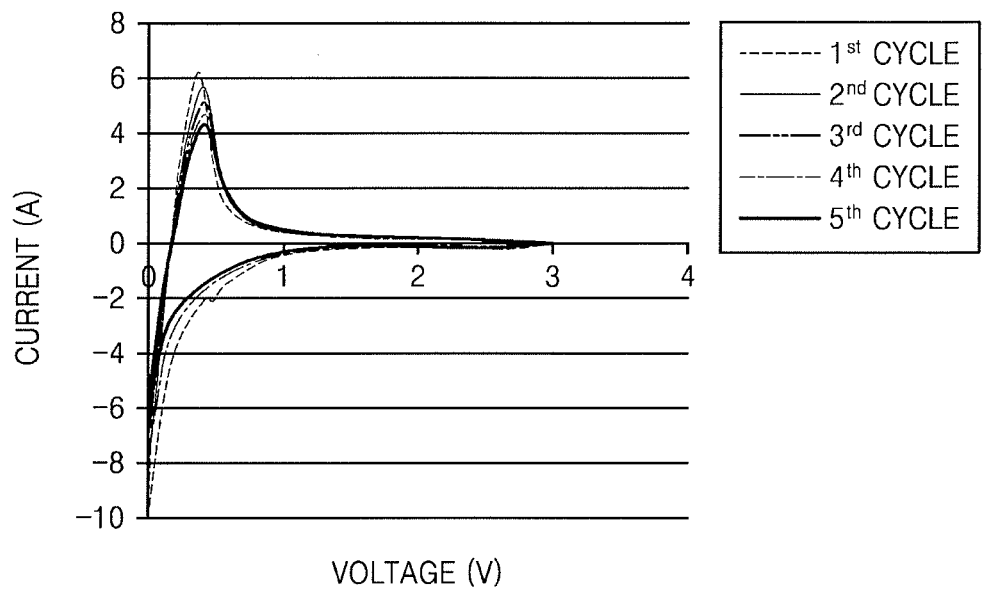
FIG. 2 illustrates cyclovoltametry analysis results of a tri-electrode cell manufactured according to Comparative Example 1.
Figure 3:
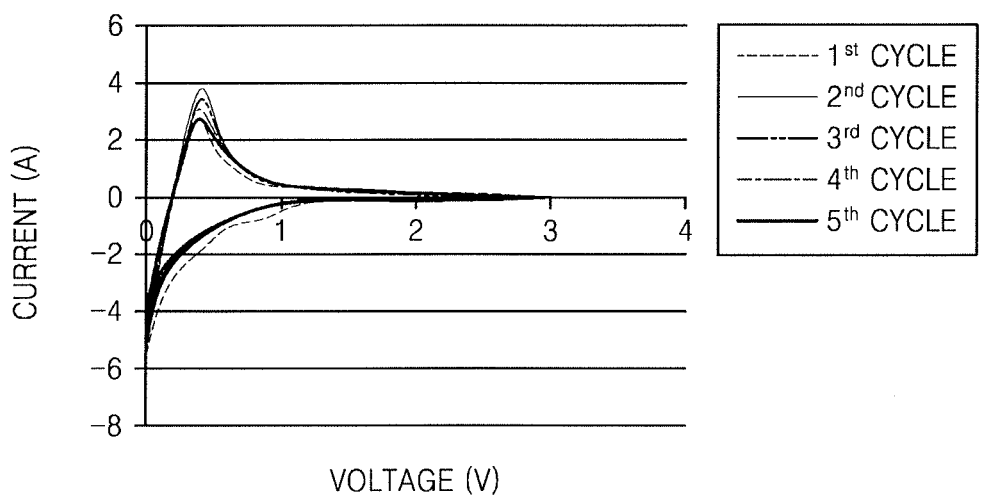
FIG. 3 illustrates cyclovoltametry analysis results of a tri-electrode cell manufactured according to Example 1.

Cyclovoltametry analysis results of the tri-electrode cells manufactured according to Comparative Example 1 and Example 1 are shown in FIG. 2 and FIG. 3.

Referring to FIGS. 2 and 3, in the case of Comparative Example 1, during reduction, at about 0.5 V, EC decomposed, and in the case of Example 1, during reduction, at about 0.9 V, the compound represented by Formula 9 used as the additive decomposed. From these results, it may be assumed that since, during reduction, the compound of Formula 9 used as the additive decomposes more quickly than the organic solvent, decomposition of the organic solvent may be prevented and accordingly, an increase in interior resistance may be suppressed.

Evaluation Example 2: Differential Charge and Discharge (dQ/dV) Analysis

The coin full cells manufactured according to Comparative Example 1 and Examples 1 and 2 were charged with a constant current at a rate of 0.1 C at a temperature of 25° C. until the voltage reached 4.30 V (vs. Li), and then, in a constant voltage mode, while the voltage of 4.30 V was maintained, the coin full cells were cut-off at a rate of 0.05 C. Then, the coin full cells were discharged with a constant current at a rate of 0.1 C until the voltage dropped to 2.8 V (vs. Li).

Figure 4:
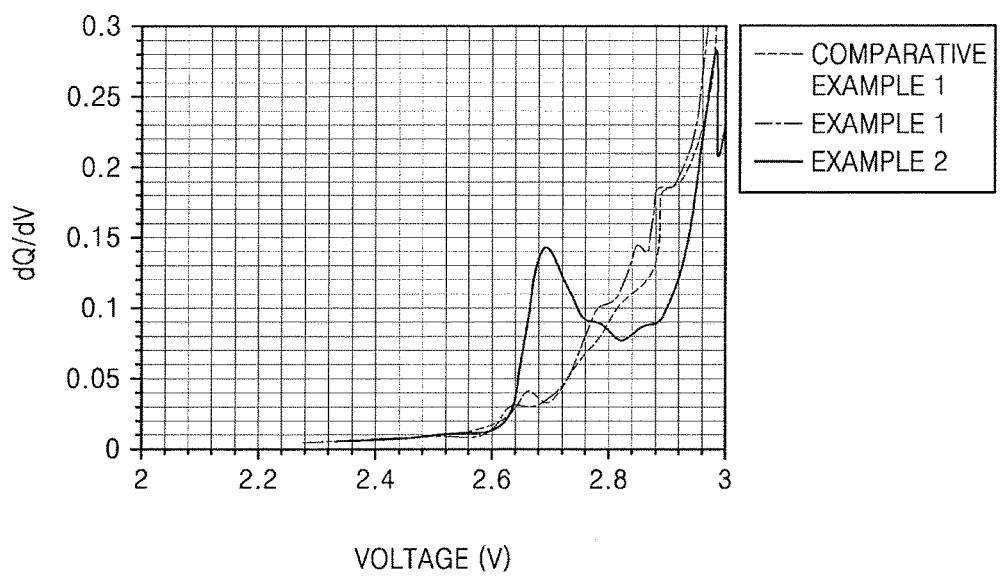
FIG. 4 illustrates a graph of differential charge and discharge (dQ/dV) during an initial cycle of coin full cells manufactured according to Comparative Example 1 and Examples 1 and 2.

FIG. 4 shows a graph of a differential charge and discharge (dQ/dV) in this cycle.

Referring to FIG. 4, in the case of Comparative Example 1, a reduction decomposition peak appears at about 2.9 V, and in the case of Examples 1 and 2, a reduction decomposition peak appears in a voltage range that is less than 2.9 V. From these results, it may be confirmed that the compound of Formula 9 used as the additive reduction-decomposes in a voltage range less than that of EC. Meanwhile, the greater the amount of the additive, the stronger the reduction decomposition peak.

Evaluation Example 3: Room-Temperature Lifespan Characteristics Evaluation

The coin full cells manufactured according to Comparative Example 1 and Examples 1 and 2 were charged with a constant current at a rate of 0.2 C at a temperature of 25° C. until the voltage reached 4.2 V, and then, discharged with a constant current at a rate of 0.2 C until the voltage reached 2.5 V. Then, the coin full cells were charged with a constant current at a rate of 0.5 C until the voltage reached 4.2 V, and while the voltage of 4.2 V was maintained, the coin full cells were charged at a constant voltage until the current reached 0.05 C. Then, until the voltage reached 2.5 V, the coin full cells were discharged with a constant current of 0.5 C.

(Formation Process)

The coin full cells that had been subjected to the formation process, were charged with a constant current at a rate of 1.33 C at a temperature of 25° C. until the voltage reached 4.2 V, and while the voltage of 4.2 V was maintained, the coin full cells were charged at a constant voltage until the current reached 0.05 C. Then, until the voltage reached 2.5 V, the coin full cells were discharged with a constant current at a rate of 1.33 C. This charging and discharging cycle was repeatedly performed 60 times.

Figure 5:
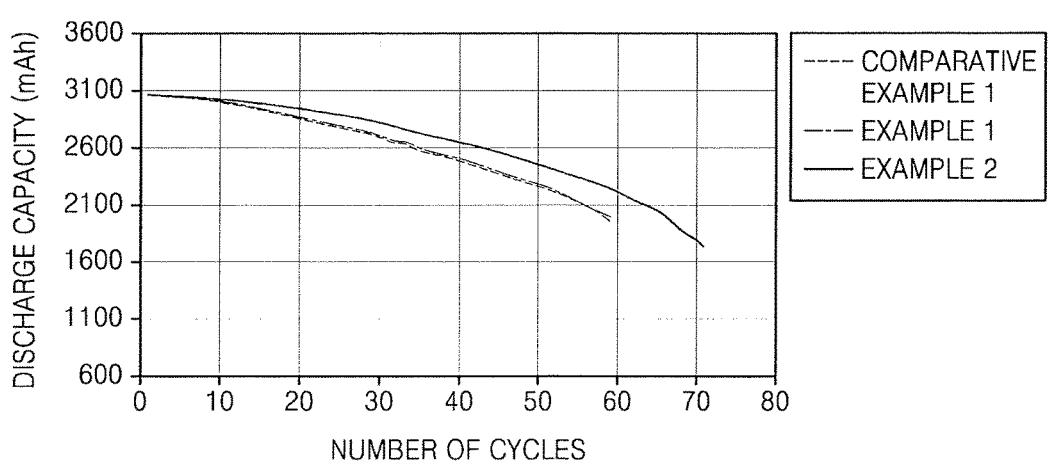
FIG. 5 illustrates room temperature-lifespan characteristics evaluation results of coin full cells manufactured according to Comparative Examples 1 and Examples 1 and 2.

Regarding each of the coin full cells, a discharge capacity was measured in each cycle. Results thereof are shown in FIG. 5.

Regarding each of the coin full cells, a capacity retention ratio (%) in the $60^{th}$ cycle was calculated according to Equation 1. Results thereof are shown in Table 1.

Capacity retention ratio [%]=[discharge capacity in $60^{th}$ cycle/discharge capacity in $1^{st}$ cycle]×100   <Equation 1>

TABLE 1

| | Additive | Capacity retention ratio in 60th cycle (%) |
|---|---|---|
| Comparative Example 1 | None | 65% |
| Example 1 | Formula 9, 1 wt % | 67% |
| Example 2 | Formula 9, 7 wt % | 73% |

Referring to FIG. 5 and Table 1, it may be confirmed that Examples 1 and 2 have a higher discharge capacity than Comparative Example 1 in each cycle. From this result, it may be seen that the use of the compound of Formula 9 used as the additive contributed to an improvement in room-temperature lifespan characteristics. It may also be seen that the greater the amount of the additive, the better the lifespan characteristics Evaluation Example 4: Amount of Gas Generated after High-Temperature Storage The coin full cells of Comparative Example 2 and Example 1 were stored at a temperature of 60° C. for 20 days. Then, a jig for gas-capturing was used to drill a hole in a bottom end of each of the coin full cells, and gas generated in the coin full cells was quantified by a gas chromatography (GC) system which was connected thereto without leakage of the gas.

Figure 6:
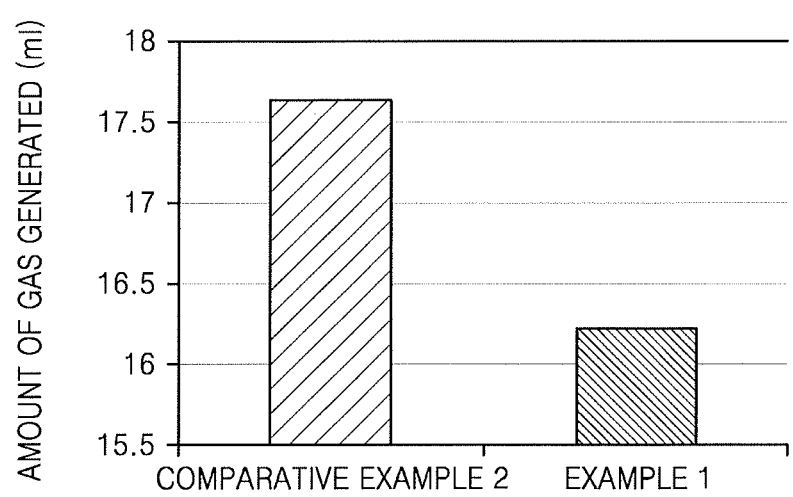
FIG. 6 illustrates a graph of an amount of gas generated in coin full cells manufactured according to Comparative Example 2 and Example 1 after 20 days of high-temperature storage.

Results obtained thereby are shown in FIG. 6.

Referring to FIG. 6, it may be confirmed that when the sulfonate group-containing carbonate compound of Formula 9 was used, much less gas was generated than when FEC was used. FEC is structurally similar to the sulfonate group-containing carbonate compound of Formula 9, except for not including a sulfonate group. From this result, it is seen that an electrolyte according to an embodiment improves the stability of a lithium battery compared to the commercially available FEC-containing electrolyte.

Electrolytes according to embodiments may generate less gas, leading to higher stability of a manufactured secondary battery.

By way of summation and review, various electrode systems have been suggested to provide high capacity. For example, silicon-based anode active materials can be applied to an anode to obtain high capacity. However, a silicon anode expands in volume when lithium intercalates/deintercalates. During cycling, the volumetric expansion may lead to cracks, and a solid-electrolyte interface (SEI) may be newly formed, thereby increasing the thickness of a thin film and depleting the electrolyte. Due to these factors, the lifespan of a lithium secondary battery may decrease.

Batteries having greater capacity have a smaller number of pores therein. In this case, even when the amount of gas generated due to decomposition of an electrolytic solution may be small, the pressure inside a battery may increase. Thus, the stability of the battery may decrease.

To address these issues, it is desirable to optimize various battery constituting elements, together with the development of active materials having high capacity.

Embodiments provide an electrolyte capable of conferring lifespan characteristics and stability to a secondary battery. Embodiments also provide a secondary battery including the electrolyte.

An electrolyte according to an embodiment of the present disclosure includes an organic solvent and a cyclic ester compound that is substituted with a sulfonate group.

When an electrode is reduced, the cyclic ester compound decomposes faster than the organic solvent included in the electrolyte, so that decomposition of the organic solvent may be prevented.

The cyclic ester compound may also contribute to a decrease in an amount of gas generated due to the decomposition of the electrolyte, leading to higher stability of a secondary battery that requires high capacity. The cyclic ester compound includes a sulfonate group, and thus, when stored at a high temperature, a stable thin film is formed on the surface of an anode. Compared to a cyclic ester compound that does not include a sulfonate group, the cyclic ester compound including a sulfonate group may effectively suppress an interior resistance increase of a secondary battery.

When the cyclic ester compound represented by Formula 1 is used, during initial charging and discharging, the sulfonate group is adsorbed on the surface of an anode to form a polymer thin film, thereby suppressing a resistance increase of the anode. Since the cyclic ester compound represented by Formula 1 forms a thin film on the surface of the anode, decomposition of the electrolyte due to contact between the electrolyte and a cathode or anode active material is suppressed and gas is less generated. As a result, an increase in the interior resistance of a secondary battery may be suppressed.

Even when charging and discharging are repeatedly performed, the capacity of the cyclic ester compound represented by Formula 1 may be quickly stabilized, and a strong thin film may be formed and, thus, thermal stability may be obtained. Accordingly, high-temperature characteristics may be improved and output characteristics may be improved.

The cyclic ester compound may generate less gas, while having a structure that is similar to that of a sulfonate group-free cyclic ester compound, for example, fluoroethylene carbonate (FEC), which is mainly used as an electrolyte additive for a high-capacity secondary battery. Accordingly, as an alternative to FEC, the cyclic ester compound may provide a secondary battery that has excellent room-temperature lifespan characteristics and improved high-temperature stability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. An electrolyte, comprising:
a cyclic ester compound including a cyclic ester group substituted with a sulfonate group, the sulfonate group being represented by Formula 2:

[Formula 2]

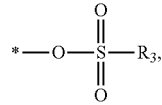

wherein, in Formula 2, * represents a ring carbon of the cyclic ester group, R₃ is a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group; and an organic solvent, wherein the sulfonate group is bonded directly to the ring carbon of the cyclic ester group through an oxygen atom of the sulfonate group.

2. The electrolyte as claimed in claim 1, wherein the cyclic ester compound is represented by Formula 1:

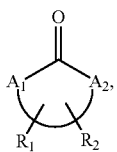

[Formula 1]

wherein, in Formula 1, $A_1$ and $A_2$ each independently are oxygen (O) or sulfur (S),

is selected from a substituted or unsubstituted C1 to C10 alkylene group or a substituted or unsubstituted C2 to C10 alkenylene group, and at least one selected from $R_1$ and $R_2$ is a sulfonate group, wherein, when only one of $R_1$ and $R_2$ is a sulfonate group, the other one of $R_1$ and $R_2$ is hydrogen, a halogen, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group, and wherein the at least one selected from $R_1$ and $R_2$ that is a sulfonate group is directly bound to a cyclic portion of

through an oxygen atom of the sulfonate group.

3. The electrolyte as claimed in claim 2, wherein: $A_1$ and $A_2$ are each oxygen (O).

4. The electrolyte as claimed in claim 1, wherein:

the cyclic ester compound includes at least one of compounds represented by Formula 3 or Formula 4:

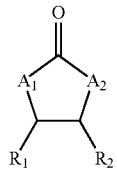

[Formula 3]

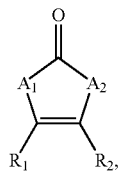

[Formula 4]

wherein, in Formulae 3 and 4, $A_1$ and $A_2$ each independently are oxygen (O) or sulfur (S), at least one selected from $R_1$ and $R_2$ is a sulfonate group represented by Formula 2, wherein, when only one of $R_1$ and $R_2$ is a sulfonate group, the other one of $R_1$ and $R_2$ is hydrogen, a halogen, a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group:

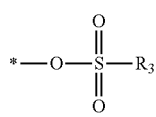

[Formula 2]

wherein, in Formula 2, $R_3$ is a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 arylalkyl group, a substituted or unsubstituted C1 to C10 heteroalkyl group, a substituted or unsubstituted C2 to C30 heterocyclic group, or a substituted or unsubstituted C2 to C30 heteroaryl group.

5. The electrolyte as claimed in claim 1, wherein:

the cyclic ester compound includes at least one of compounds represented by Formulae 5 to 8:

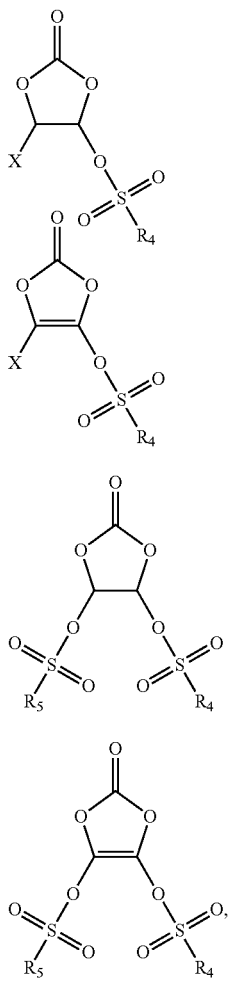

[Formula 5]

[Formula 6]

[Formula 7]

[Formula 8]

wherein, in Formulae 5 to 8,

X is hydrogen, a halogen, a halogen-substituted or unsubstituted C1 to C30 alkyl group, a halogen-substituted or unsubstituted C2 to C30 alkenyl group, or a halogen-substituted or unsubstituted C2 to C30 alkynyl group, and $R_4$ and $R_5$ each independently are a halogen-substituted or unsubstituted C1 to C30 alkyl group, a halogen-substituted or unsubstituted C2 to C30 alkenyl group, or a halogen-substituted or unsubstituted C2 to C30 alkynyl group.

6. The electrolyte as claimed in claim 5, wherein:

in Formulae 5 and 6, X is hydrogen, a halogen, or a substituted or unsubstituted C1 to C30 alkyl group, and in Formulae 5 to 8, $R_3$, $R_4$, and $R_5$ each independently are a substituted or unsubstituted C1 to C30 alkyl group.

7. The electrolyte as claimed in claim 1, wherein:

an amount of the cyclic ester compound is in a range of 0.01 wt % to 20 wt % based on a total weight of the electrolyte.

8. The electrolyte as claimed in claim 1, wherein:

the organic solvent includes at least one selected from a carbonate-based solvent, an ester-based solvent, an ether-based solvent, a ketone-based solvent, an alcohol-based solvent, and an aprotic solvent.

9. The electrolyte as claimed in claim 1, further comprising a lithium salt.

10. A secondary battery comprising the electrolyte as claimed in claim 1.

11. The secondary battery as claimed in claim 9, wherein:

the secondary battery operates at a voltage range of 2.8 V to 4.6 V.

12. The secondary battery as claimed in claim 9, wherein the secondary battery is a lithium secondary battery.

* * * * *